March 25, 1930.  J. N. HICKS  1,751,632
DEEP WELL PRESSURE RECORDER
Filed June 29, 1927
Fig. 1.
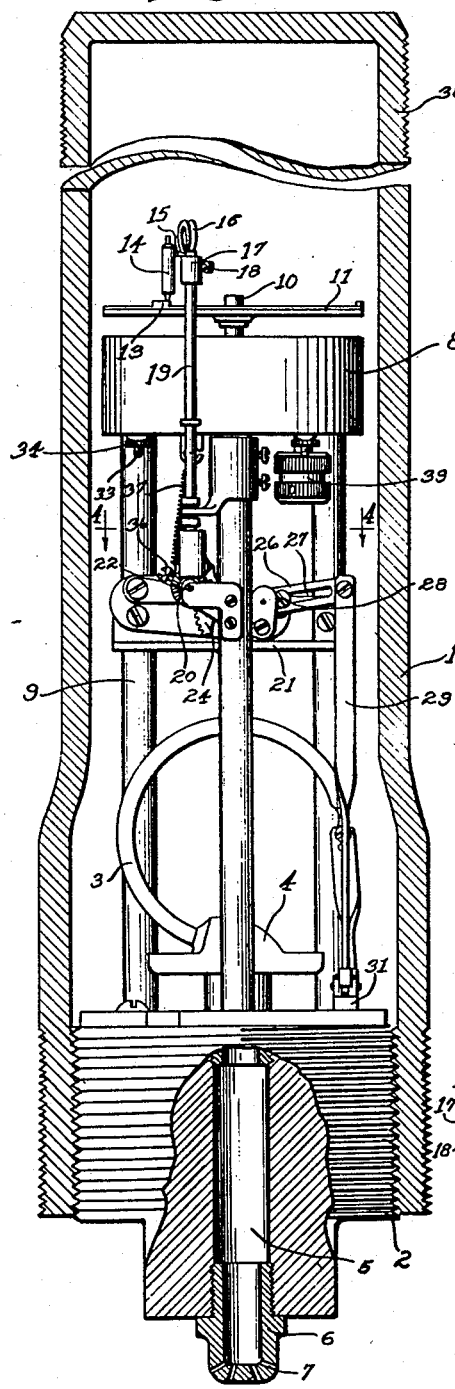
Fig. 2.
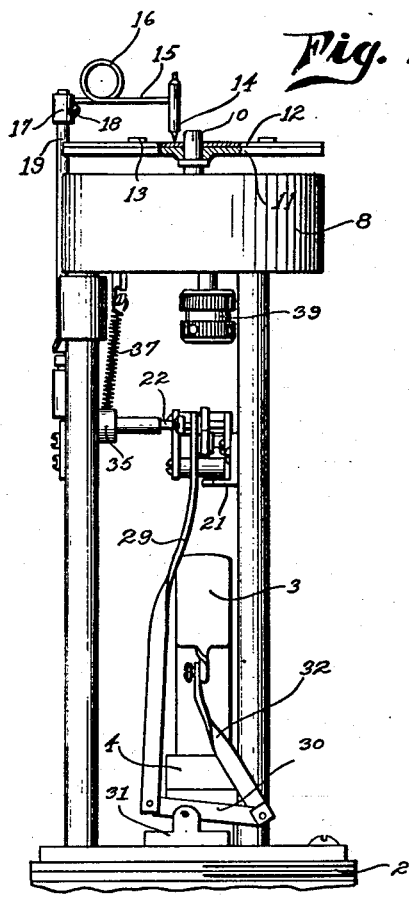
Fig. 4.
Fig. 3.
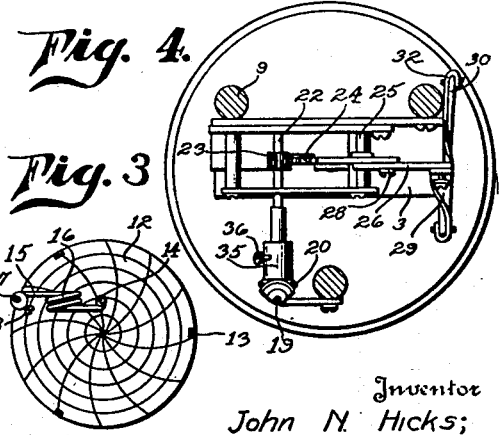
Inventor
John N. Hicks;
By Lyon+Lyon
Attorneys Patented Mar. 25, 1930

1,751,632

UNITED STATES PATENT OFFICE

JOHN N. HICKS, OF LOS ANGELES, CALIFORNIA

DEEP WELL PRESSURE RECORDER

Application filed June 29, 1927. Serial No. 202,220.

This invention relates to a gage for recording the variations of pressure at the bottom of a deep well. It is frequently desirable to produce a record showing the variations in the pressure at the bottom of a well throughout a period of time. I am aware that clock motors have been used in combination with pressure sensitive devices for indicating variations of pressure, but such gages are not of compact construction and not adapted for use in deep wells. The general object of this invention is to produce a compact recording pressure gage, the parts of which can be readily assembled in a casing of relatively small diameter adapted to be passed down a well casing, and constructed in such a way as to facilitate the imparting of the movements to the recording stylus.

A further object of the invention is to provide a simple organization of parts of such a gage which will enable it to perform its functions effectively, and constructed in such a way as to facilitate the placing and removal of the chart on which the record is taken; also to provide a construction which will enable the chart to have substantially the area of the cross section of the casing of the instrument.

The charts employed are preferably of circular form and mounted on a spindle driven by the motor or clock. One of the objects of this invention is to construct the parts so as to facilitate the attachment of the chart and dial in any position on the spindle to correspond with the particular time of day at which the recording commences.

Further objects of the invention will appear hereinafter.

The invention consists of the novel parts and combination of parts to be described hereinafter, all of which contribute to produce an efficient deep well pressure recorder.

A preferred embodiment of the invention is described in the following specification, while the broad scope of the invention is pointed out in the appended claims.

In the drawings:

Figure 1 is a vertical section through a gage embodying my invention, the upper portion of the casing being broken away.

Figure 2 is a view similar to Figure 1, but showing the shell of the casing removed and with the bottom of the casing broken away.

Figure 3 is a plan of the dial and showing a chart in position upon it; this view indicates the relation of the recording arm carrying the pencil or stylus that records the pressure on the dial as it rotates.

Figure 4 is a cross section through the instrument taken about on the line 4—4 of Figure 1.

In practicing the invention, I provide a vertically elongated casing in which I mount a pressure actuated part, for example, a Bourdon tube. The interior of this tube is exposed to the pressure existing within the well. Within the casing I mount a clock motor which operates to drive a chart and on this chart I record the movements of the Bourdon tube to correspond with the changes in pressure. On account of the relatively small space within the well casing, it is necessary to provide a very compact construction or organization for the parts of the instrument. However, by placing the Bourdon tube so that it lies in a vertical plane, the end of the tube will move in a substantially vertical plane and in a direction which is admirably adapted to impart the recording movements to the recording stylus or pencil. It simplifies the construction to place the Bourdon tube at the bottom of the casing and the clock mechanism in the upper part, the space between the same being utilized for the mechanism that transmits the movement to the recording arm of the instrument, and this arrangement also enables the dial to be placed in an exposed position on the upper end of the instrument. This greatly facilitates the placing and removal of the recording chart.

In order to accomplish these results, I prefer to employ a vertically elongated casing 1 which is in the form of a tube. If desired, this tube can be slightly enlarged in diameter at its lower end. The casing is provided with a bottom 2 preferably in the form of a threaded plug that screws into the lower end of the tubular shell that forms the body of the casing. Within the casing 1 and above the bottom 2, I provide a pressure sensitive member, for example, a Bourdon tube 3. This Bourdon tube has its fixed end attached to a base 4, and this end of the tube communicates with the interior of the well so as to admit the gas under pressure. For this purpose the plug 2 is provided with a central opening 5, the lower end of which may be closed by a screw cap 6 having small perforations 7 enabling the plug to operate as a screen. The plug 2 supports a frame which, in turn, supports a motor 8 which is a clock motor. The frame is preferably of very simple construction and may consist of a plurality of posts or stanchions 9, the lower ends of which are mounted on the upper end of the plug 2.

The motor 8 has a casing of cylindrical form with the axis of the motor casing coinciding with the central axis of the instrument, and the mechanism within the motor driving a spindle 10. The spindle 10 carries a friction tight dial 11 and on this dial I place a chart 12 of circular form, see Figure 3. The edges of the dial have small clips or tongues 13 which are received in small notches in the edge of the chart so as to insure that the chart can not slip on the dial after it has been put in place.

The record is made on the dial by means of a stylus or pencil 14 which is carried on a recording arm 15. This recording arm is preferably in the form of spring wire having a coil 16 that operates to press the pencil lightly against the face of the chart. The arm is mounted to rotate on a substantially vertical axis and for this purpose includes a hub 17 which is adjustably secured by means of a set screw 18 to the upper end of a shaft 19. This shaft extends vertically in the casing and at its lower end bevel gears 20 are provided (see Figure 4) for imparting the rotary movement to it from the Bourdon tube. The mechanism for rotating the shaft 19 from the Bourdon tube is partially supported on the bracket 21 supported on two of the posts 9 and this mechanism includes a horizontal shaft 22 supported in the bracket and carrying a pinion 23 which is driven by a segment 24. This segment is mounted on a horizontal shaft 25 and carries an arm 26. At this point in the mechanism I prefer to provide means for regulating the ratio of movement imparted from the Bourdon tube to the recording pencil. For this purpose the segment is provided with an adjustable arm 26. This arm is provided with a longitudinal slot 27 and a clamping screw 28 passes through the slot. This clamping screw enables the arm to be secured to the segment in a more or less extended position, thereby changing the length of the arm 26. This arm 26 is connected to the Bourdon tube by a long twisted link 29 which extends downwardly and has its lower end attached to the short arm of a lever 30, said lever being mounted to rock on a bracket 31 on the upper face of the bottom 2. The long arm of this lever is connected by a twisted link 32 with the end of the Bourdon tube.

The motor is provided with a threaded regulating stem 33 (see Figure 1) which carries a regulating nut 34. By adjusting this nut 34 the speed of movement of the motor can be regulated.

In order to take up the back-lash of the mechanism supported on the bracket 21 I provide the hub 35 of the bevel gear that is carried on the shaft 22, with a small screw 36 to which I attach a coil spring 37 (see Figure 1). This coil spring pulls in a direction to take out the back-lash of the teeth of the mechanism.

The upper end of the shell of the casing is provided with threads 38 which enable it to be attached to the lower end of a string of pipe or to a cable socket which can be used to lower the instrument down into the well.

In using the instrument, when it is desired to put the chart 12 in position the recording pencil 14 may be raised by pulling up on the arm 15. This movement is facilitated by the presence of the coil 16. This enables the chart to be put in place on the dial. The dial can then be moved into any position to start the pencil on the dial at a point corresponding to any desired hour. The friction joint of the dial on the spindle 10 permits this rotary adjustment of the chart to be made. The motor may be wound up by means of a winding head 39.

The instrument is then lowered to the bottom of the well. The gas, oil, water, or fluid under pressure passes up the port 5 and is received within the Bourdon tube 3. The movements of this tube, due to the variations of the pressure, are imparted through the links 32 and 29, and the mechanism on the bracket 21 thus produces rotation of the shaft 19. The rotation of this shaft is imparted to the recording arm 15. As the dial rotates, the arm, of course, draws a line on the chart, which indicates the pressure exerting in the well at any particular time.

It is understood that the embodiment of the invention described herein is only one of the many embodiments this invention may take, and I do not wish to be limited in the practice of the invention, nor in the claims, to the particular embodiment set forth.

What I claim is:

1. In a recording pressure gage for deep wells, having a vertically elongated fluid tight casing, the combination of a frame within the casing, a motor mounted in one end of the casing and having a substantially vertical spindle driven by the mechanism of the motor, a dial carried by the spindle for carrying an indicating chart, a pressure-actuated member within the casing having an opening for admitting the fluid in the well, marking means associated with the dial for marking the chart carried on the dial, and means connecting the marking means and the pressure actuated member.

2. In a recording pressure gage for deep wells, having a vertically elongated fluid tight casing, the combination of a frame within the casing, a motor supported on the frame at the upper end of the casing and having a substantially central vertical spindle disposed substantially on the central vertical axis of the casing and driven by the mechanism of the motor, a dial carried by the spindle for carrying an indicating chart, a pressure-actuated member in the lower portion of the casing having an opening for admitting the fluid in the well, a substantially vertical shaft supported in the frame and extending up past the motor, a marking arm carried by the shaft to cooperate with the chart on the dial, and means connecting the pressure actuated member with the shaft for rotating the same to correspond with the movements of the pressure-actuated member.

3. In a recording pressure gage for deep wells, the combination of a substantially tubular fluid tight casing having a bottom with an opening through the same for admitting gas under pressure within the well, a Bourdon tube within the casing with its lower end attached to said opening to receive the gas or liquid in the well under pressure, a motor mounted in the upper part of the casing, with a dial above the motor driven by the mechanism of the motor for carrying an indicating chart, a shaft extending longitudinally in the casing up to a point above the dial, a marking arm carried by the said shaft for marking the chart as the dial rotates, and means connecting the end of the Bourdon tube with the shaft to rotate the same to correspond with the movements of the tube.

4. In a recording pressure gage for deep wells, the combination of a substantially tubular fluid tight casing closed at its upper end and having a plug threaded into the lower end thereof with an opening through the same for admitting gas under pressure, a Bourdon tube within the casing with its lower end attached over said opening to receive the gas under pressure, a motor mounted in the upper part of the casing, a dial above the motor driven by the mechanism of the motor and carrying an indicating chart, a plurality of posts supported on the plug and supporting the said motor, a marking arm supported above the dial and means connecting the end of the Bourdon tube with the marking arm to move the same to correspond with the movements of the tube.

5. In a recording pressure gage for deep wells, the combination of a vertically elongated fluid tight casing, a Bourdon tube mounted in the casing communicating with the exterior to receive gas or liquid under pressure from the well and disposed in a substantially vertical plane, a motor within the casing with a dial driven by the mechanism of the motor and carrying an indicating chart, a marking arm for marking the chart, and means connecting the marking arm with the Bourdon tube to move the arm to correspond with the movements of the tube.

6. In a recording pressure gage for deep wells, the combination of a substantially tubular fluid tight casing closed at its upper end and having a threaded plug in the lower end thereof with an opening for admitting gas under pressure within the well, a Bourdon tube within the casing disposed in a substantially vertical plane and mounted over said opening to receive the gas under pressure, a plurality of substantially vertical posts secured in said plug, a motor supported on the posts with a dial driven by the mechanism of the motor for carrying an indicating chart, a substantially vertical shaft with a marking arm to cooperate with the dial, and means connecting the shaft with the end of the Bourdon tube to move the arm to correspond with movements of the tube.

7. In a recording pressure gage for deep wells, the combination of a tubular fluid tight casing with a bottom head having an opening to admit the gas under pressure, a Bourdon tube mounted within the casing over the opening in a substantially vertical plane, a motor supported within the casing, a dial driven by the mechanism of the motor and carrying an indicating chart above the motor, a bracket supported between the Bourdon tube and the motor, a vertical shaft extending upwardly past the motor and carrying a marking arm to cooperate with the dial, means supported on the bracket for rotating the shaft, and means connecting the same with the Bourdon tube to actuate the arm to correspond with the movements of the tube.

8. In a recording pressure gage for deep wells, the combination of a substantially tubular fluid tight casing, a plug threaded into the lower end of the casing, a plurality of substantially vertical posts supported on the plug within the casing, a Bourdon tube supported on the plug mounted so as to receive the gas under pressure and disposed in a substantially vertical plane, a motor supported on the posts with a dial driven by the mechanism of the motor and carrying an indicating chart, a marking arm for marking the chart, a shaft carrying the arm and extending substantially vertically down past the motor, a bracket between the motor and the plug, mechanism on the bracket for rotating the shaft and including means for adjusting the ratio movement between the Bourdon tube and the recording arm, and means connecting the last named mechanism with the Bourdon tube for moving the marking arm to correspond with the movements of the Bourdon tube.

9. In a recording pressure gage for deep wells, the combination of a fluid tight casing, a Bourdon tube mounted in the casing and communicating with the exterior thereof, a motor having a spindle driven by the mechanism of the motor, a dial mounted on the spindle, and carrying a recording chart, and marking means to cooperate with the chart and connected with the Bourdon tube.

Signed at Los Angeles, California, this 15 day of June, 1927.

JOHN N. HICKS.